United States Patent [19]
Sasagawa et al.

[11] Patent Number: 5,166,285
[45] Date of Patent: Nov. 24, 1992

[54] HARD TRANSPARENT RESINS AND PROCESS FOR THE PRODUCTION THEREOF

[75] Inventors: Katsuyoshi Sasagawa; Yoshinobu Kanemura; Masao Imai; Toshiyuki Suzuki, all of Kanagawa, Japan

[73] Assignee: Mitsui Toatsu Chemicals, Inc., Tokyo, Japan

[21] Appl. No.: 835,307

[22] Filed: Feb. 14, 1992

Related U.S. Application Data

[62] Division of Ser. No. 362,248, Jun. 6, 1989, Pat. No. 5,104,953.

[30] Foreign Application Priority Data

Jun. 9, 1988 [JP] Japan .................. 63-140484

[51] Int. Cl.$^5$ .............................. C08F 12/30
[52] U.S. Cl. ................... 526/288; 526/301
[58] Field of Search ...................... 526/301, 288

[56] References Cited

U.S. PATENT DOCUMENTS 4,343,919 8/1982 Tefertiller ............... 526/301
4,514,552 4/1985 Shay et al. ............... 526/301
4,980,497 12/1990 Sasagawa et al. .......... 526/301

Primary Examiner—Joseph L. Schofer
Assistant Examiner—Alex H. Walker
Attorney, Agent, or Firm—Burns, Doane, Swecker & Mathis

[57] ABSTRACT

The present invention relates to a process for preparing a hard transparent resin comprising polymerizing a monomer (A) having both a functional group of the following formula (I):

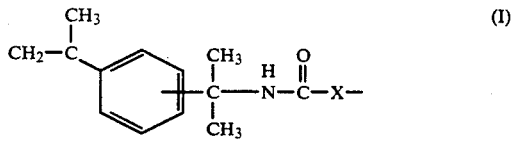

wherein X is selected from the group consisting of an oxygen atom and a sulfur atom, and a functional group selected from the group consisting of a functional group of the formula (II):

$$CH_2CR-COO- \qquad (II)$$

wherein R is selected from the group consisting of hydrogen and methyl group, and a functional group of the formula (III):

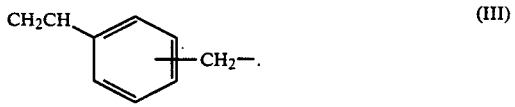

The invention also provides a process for preparing a transparent resin comprising copolymerizing monomer (A) with a monomer (B) having at least one functional group selected from the group consisting of $CH_2CH=COO-$,
$CH_2=C(CH_3)-COO-$, and

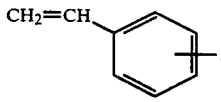

This resin can be suitably used as a glazing material, and in the manufacture of optical lenses, optical information recording medium substrates, etc. It has a crosslinked structure, high surface hardness, and may be easily polymerized.

4 Claims, No Drawings

HARD TRANSPARENT RESINS AND PROCESS FOR THE PRODUCTION THEREOF

This application is a divisional of application Ser. No. 07/362,248, filed Jun. 6, 1989 now U.S. Pat. No. 5,104,953.

BACKGROUND OF THE INVENTION (1) Field of the Invention

The present invention relates to transparent resins having high surface hardness and excellent heat resistance, that are suitable for applications such as glazing materials, optical information recording media and optical lenses.

(2) Description of the Prior Art

Methacrylic resins and polycarbonate resins have excellent transparency and mechanical properties, and are accordingly widely used as covers for light fixtures and signboards, and vehicle windows. Recently, the potential use of plastic lenses and substrates for optical disks has also been discussed. However, since these resins are linear polymers, their surface hardness and chemical resistance are not necessarily sufficient for these applications. Moreover, if the surface of the resin is treated with a hard coating agent, the selection of the type of the solvent that can be used is quite limited. Accordingly, in these respects, improvement in these types of resins is eagerly awaited.

To improve the surface hardness and the chemical resistance of methyl methacrylate resins, various methods have been proposed wherein a monomer having polymerizable functional groups is added to methyl methacrylate, and copolymerization is carried out to cause crosslinking to occur. However, a disadvantage of these methods is that the volume decrease of methyl methacrylate itself is high (about 21%) when polymerized, and the crosslinking reaction proceeds simultaneously with the onset of polymerization. This means that pre-polymerization processes cannot be performed. That is, in the early stages of polymerization, since the viscosity increases sharply, the mixture loses fluidity, and it becomes difficult to transfer the liquid for injection. Thus, in these methods, casting polymerization must be carried out without pre-polymerization, and therefore the problem of volume decrease, or shrinkage, cannot be solved.

Crosslinked resins produced by polymerizing diethylene glycol diallyl carbonate are widely known for their excellent surface hardness, but the volume shrinkage thereof is also high (about 14%) when polymerized, and it takes a long time before polymerization is complete. Again this cannot be solved by pre-polymerization, because of problems similar to those encountered with the above methods.

In order to solve these problems, urethane polyacrylic esters and urethane polymethacrylic esters have been proposed (Japanese Laid-Open Patent Application Nos. 3610/1986, and 75022/1988). However, since these monomers, like those discussed above, have only an acryl group or a methacryl group in the molecule, whose polymerization rate is similar, a crosslinking reaction also proceeds when free radical polymerization is effected. Consequently, pre-polymerization is difficult to carry out, and polymerization is hardly controlled, and takes place rapidly, with the likely result that the resultant polymer will separate from the mold and have a rough surface.

SUMMARY OF THE INVENTION

The present invention overcomes the problems and disadvantages of the prior art by providing a process for producing synthetic resins that are both highly transparent and possess high surface hardness.

An object of the present invention is to provide transparent resins that have a crosslinked structure and high surface hardness.

A further object of the present invention is to provide a process for producing a hard transparent resin, in which control of polymerization is easy, the run-away reaction at the onset of polymerization is easily controlled, and the polymerization time is capable of being considerably reduced.

Yet another object of the present invention is to provide a hard transparent resin well adapted for use as a glazing material.

A still further object of the present invention is to provide a hard transparent resin well suited for use in the manufacture of optical lenses and optical recording media.

These and other objects and advantages of the present invention will be apparent from a reading of the description that follows, or may be learned by practicing the invention.

To achieve the objects as set forth above, the present invention provides a process for preparing transparent resin comprising polymerizing a monomer (A) having in its molecular structure both a functional group of the general formula (I):

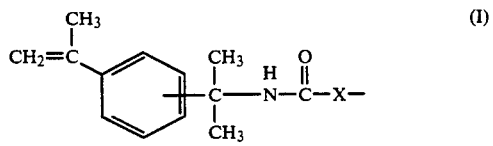

wherein X is selected from the group consisting of an oxygen atom and a sulfur atom,
and either a functional group of the general formula (II):

wherein R is selected form the group consisting of hydrogen and a methyl group, or a functional group of the formula (III):

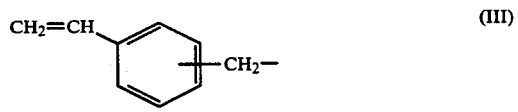

The present invention also provides a process for preparing a hard transparent resin comprising copolymerizing said monomer (A) with a monomer (B) having at least one functional group selected from the group consisting of:

-continued

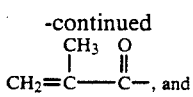, and

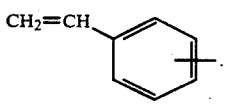

The resin obtained by polymerizing the monomer (A) alone is a very hard transparent resin having structural units of the following general formula (IV) and/or (V):

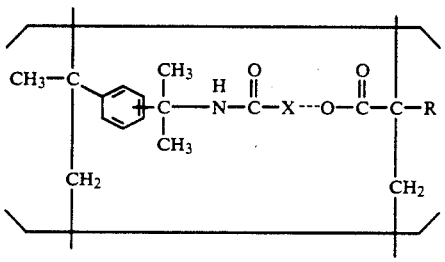 (IV)

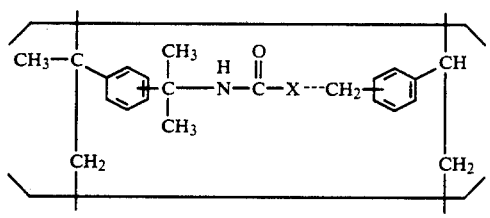 (V)

wherein X and R are defined as above.

The resin obtained by copolymerizing the monomer (A) and the monomer (B) is a resin having basically the structural units represented by the general formulas (IV) and/or (V) as a backbone to which is attached, as structural units, the monomer having at least one functional group selected from the group consisting of:

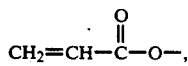

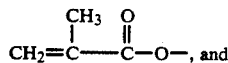, and

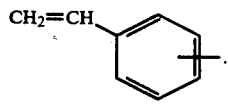

The present invention is also directed to a glazing material, produced by cast-polymerizing the monomer (A) alone or cast-copolymerizing the monomer (A) with the monomer (B), or an optical lens obtained by machining the resin after cast-polymerization.

Applicants have found that by employing a compound containing polymerizable functional groups having very different polymerization rates, and by allowing the polymerizable group having a high rate and the polymerizable group having a low rate to polymerize selectively or stepwise, transparent resins having high surface hardness are produced. Further, applicants have found that control of polymerization is easy and the polymerization time is greatly reduced.

DETAILED DESCRIPTION OF THE INVENTION

Reference will now be made in detail to the preferred embodiments of the invention.

When the monomer (A) is polymerized alone or is copolymerized with the monomer (B), not only the control of polymerization becomes quite easy in comparison with the case wherein the monomer (B) is polymerized alone, but also a transparent resin having high surface hardness can be obtained.

The monomer (A) used in the present invention that has in the molecule both a functional group of the general formula (I):

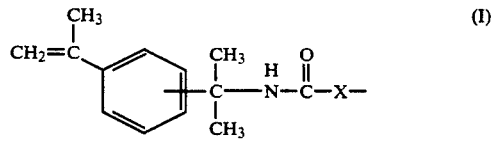 (I)

wherein X is selected from the group consisting of an oxygen atom and a sulfur atom,
and a functional group of the general formula (II):

 (II)

wherein R is selected from the group consisting of hydrogen and a methyl group,
or a functional group of the general formula (III):

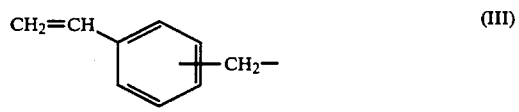 (III)

is a carbamate or a thiocarbamate obtained by reacting an isopropenyl-α,α-dimethylbenzyl isocyanate with a compound having in its molecule a hydroxyl group and/or a mercapto group, and at least one functional group selected from the group consisting of:

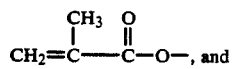, and

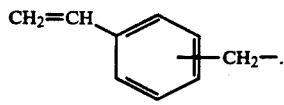

Specific and non-limiting examples of the isopropenyl-α,α-dimethylbenzyl isocyanate are 3-isopropenyl-α,α-dimethylbenzyl isocyanate and 4-isopropenyl-α,α-dimethylbenzyl isocyanate. Specific and non-limiting examples of the compound having in its molecule a hydroxyl group and/or a mercapto group, and at least one functional group selected from the group consisting of:

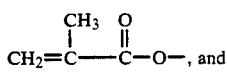
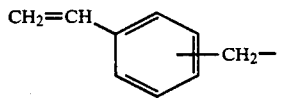

are compounds obtained by ring-opening an epoxy group or a thiirane group with acrylic acid or methacrylic acid, such as hydroxyethyl acrylate, hydroxyethyl methacrylate, hydroxypropyl acrylate, hydroxypropyl methacrylate, 1,4-butylene glycol monomethacrylate, 1,4-butylene glycol monoacrylate, glycerol-1,2-diacrylate, glycerol-1,2-dimethacrylate, glycerol-1,3-diacrylate, glycerol-1,3-dimethacrylate, and glycerol-1-acrylate-3-methacrylate, acrylic acid or methacrylic acid ring-opened reaction products of phenyl glycidyl ethers, such as 3-phenoxy-2-hydroxypropyl acrylate, 3-phenoxy-2-hydroxyppropylmethacrylate, 2,4-dibromophenoxy-2-hydroxypropyl acrylate and 2,4-dibromophenoxy-2-hydroxypropyl methacrylate; and acrylic acid or methacrylic acid ring-opened reaction products of bisphenol A diglycidyl ether, pentaerythritol triacrylate; pentaerythritol trimethacrylate, vinyl benzyl alcohol, vinyl thiobenzyl alcohol, bis(acryloyloxyethyl)isocyanurate, and bis(methacryloyloxyethyl)isocyanurate.

In order to obtain a carbamate or a thiocarbamate using these materials depending on the reaction between the isocyanate group in the isopropenyl-α,α-dimethylbenzyl isocyanate and the hydroxyl group or the mercapto group, a tin compound such as dibutyl tin dilaurate and dimethyl tin chloride or an amine such as morpholine and dimethylaminobenzene can be added to facilitate the synthesis reaction. It is preferable, however, to use a tin compound to prevent the subsequent radical reaction from becoming colored. If a solvent is used, the solvent is distilled off after the synthesis reaction. After optional purification is carried out, the product is used as the monomer (A) for the subsequent free radical reaction.

Non-limiting examples of the monomer (B) having at least one functional group selected from the group consisting of:

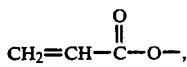
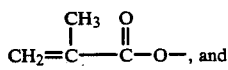
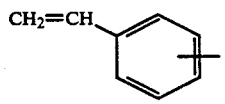

are methyl acrylate, methyl methacrylate, ethyl acrylate, ethyl methacrylate, propyl acrylate, propyl methacrylate, isopropyl acrylate, isopropyl methacrylate, cyclohexyl acrylate, cyclohexyl methacrylate, benzyl acrylate, benzyl methacrylate, ethylene glycol diacrylate, ethylene glycol dimethacrylate, diethylene glycol diacrylate, diethylene glycol dimethacrylate, neopentyl glycol diacrylate, neopentyl glycol dimethacrylate, propylene glycol diacrylate, propylene glycol dimethacrylate, dipropylene glycol diacrylate, dipropylene glycol dimethacrylate, trimethylolpropane triacrylate, trimethylolpropane trimethacrylate, pentaerythritol triacrylate, pentaerythritol trimethacrylate, pentaerythritol tetraacrylate, pentaerythritol tetramethacrylate, tris(acryloyloxyethyl)isocyanurate, tris(methacryloyloxyethyl)isocyanurate, styrene, chlorostyrene, bromostyrene, α-methylstyrene, and divinylbenzene.

To prepare the hard transparent resin in accordance with the present invention, the monomer (A) prepared above is polymerized alone or is copolymerized with the monomer (B). In either case, a cast polymerization process can be used, and the monomer (A) or a mixture of the monomer (A) and the monomer (B) can be subjected to free radical polymerization. The free radical polymerization can be thermal polymerization, ultraviolet-radiation-induced polymerization, or gamma-radiation-induced polymerization, with thermal polymerization being preferred.

There is no particular limitation on the free radical polymerization initiators, and such known compounds as peroxides, for example, benzoyl peroxide, p-chlorobenzoyl peroxide, diisopropyl peroxycarbonate, di-2-ethylhexyl peroxycarbonate, t-butylperoxy-2-ethylhexanoate, and t-butyl peroxypivalate, and azo compounds, for example, azobisisobutynonitrile, are used in amounts of 0.01 to 5wt. %.

The mixture containing the polymerization initiator can then be subjected to a known cast polymerization process, for example, the mixed solution containing the polymerization initiator is poured into a mold comprising a combination of a metal or glass mold and a gasket or a spacer, and is heated to promote setting. Prior to the onset of polymerization, if required, additives such as ultraviolet absorbers, antioxidants, coloring preventive agents, fluorescent dyes, and near infrared absorbers may suitably be added.

In the present invention a polymerizable group of the general formula (I) whose polymerization rate is low is combined with a polymerizable group whose polymerization rate is higher than the former. It is in this manner that the run-away reaction at the onset of the polymerization can be easily controlled, and not only can the polymerization time be reduced considerably, but also a highly hard transparent resin can be obtained, which is a principal object of the present invention.

Thus, the hard transparent resin produced according to the present invention has excellent heat resistance and workability as regards severing and cutting, and is well adapted for use as glazing materials, vehicle windows, optical information recording medium substrates, and optical lenses, and other advantageous applications that will be evident to those skilled in the art.

EXAMPLES

The present invention will now be described more particularly with reference to following examples, which are provided solely for purposes of illustration, and are in no way to be construed as limiting the invention to the particular materials described therein.

The first thirteen synthesis examples recount the synthesis of representative monomers (A) according to the present invention. The parts quoted in the examples are parts by weight.

SYNTHESIS EXAMPLE 1

8.3 parts of 3-isopropenyl-α,α-dimethylbenzyl isocyanate, 10.0 parts of toluene, and 4.8 parts of 2-hydroxyethyl acrylate were mixed, and the resulting reaction was carried out for 5 hours with stirring while the temperature of the reaction medium was kept at 100° C. After the reaction was complete, the reaction medium was condensed. The condensed medium was purified by chromatography to yield 2.9 parts of N-(3-isopropenyl-α,α-dimethylbenzyl)-2-acryloyloxyethyl carbamate that was colorless and syrupy.

| Elemental analysis figures (calculated for C$_{18}$H$_{23}$NO$_4$): | | | |
|---|---|---|---|
| | C | H | N |
| Found (%) | 67.62 | 7.29 | 4.39 |
| Calculated (%) | 68.12 | 7.31 | 4.42 |

NMR (δCDCl$_3$)

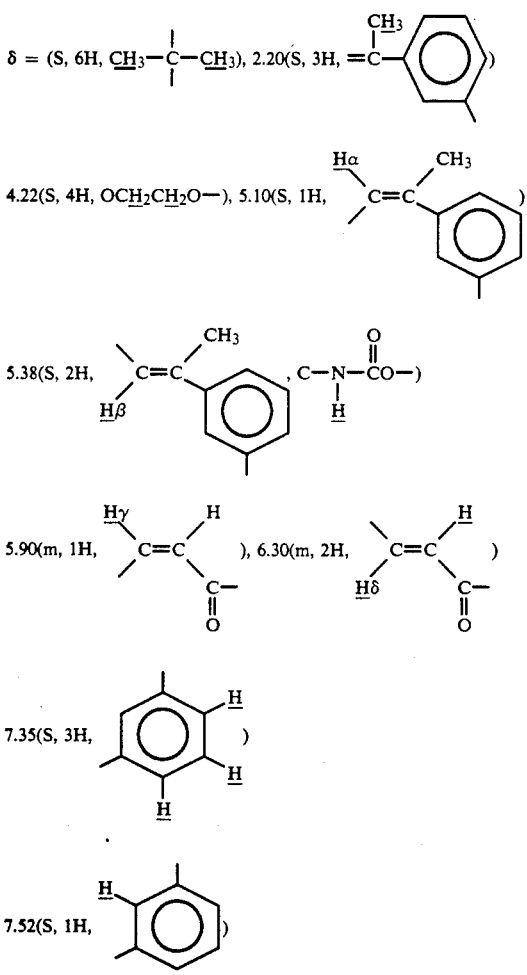

SYNTHESIS EXAMPLE 2

10.0 parts of 3-isopropenyl-α,α-dimethylbenzyl isocyanate, 6.5 parts of 2-hydroxyethyl methacrylate, and 0.1 part of dibutyl tin dilaurate (used as a urethanization reaction-promoting catalyst) were mixed, and the resulting reaction was carried our for 1 hour with stirring while the temperature of the reaction medium was kept at 65° C. After the reaction was complete, the reaction medium was purified by chromatography to yield 14.0 parts of N-(3-isopropenyl-α,αdimethylbenzyl)-2-methacryloyloxyethyl carbamate that was colorless and syrupy.

| Elemental analysis figures (calculated for C$_{19}$H$_{25}$NO$_4$): | | | |
|---|---|---|---|
| | C | H | N |
| Found (%) | 68.77 | 7.32 | 4.28 |
| Calculated (%) | 68.86 | 7.61 | 4.23 |

NMR (δ CDCl$_3$)

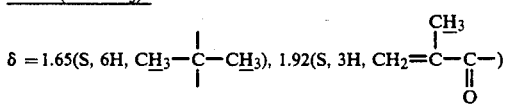

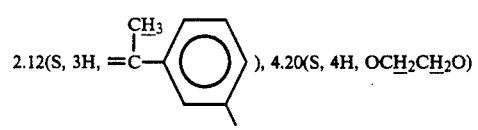

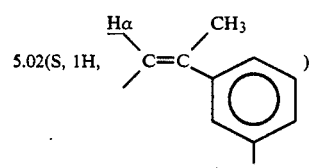

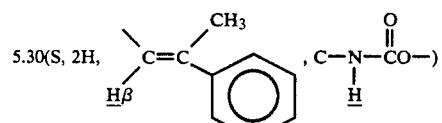

SYNTHESIS EXAMPLE 3

The procedure of Example 1 was repeated, except that 8.3 parts of 4-isopropenyl-α,α-dimethylbenzyl isocyanate were used instead of 8.3 parts of 3-isopropenyl-α,α-dimethylbenzyl isocyanate, thereby producing 3.2 parts of N-(4-isopropenyl-α,α-dimethylbenzyl)-2- acryloyloxyethyl carbamate that was colorless and syrupy.

| Elemental analysis figures (calculated for $C_{18}H_{23}NO_4$): | | | |
|---|---|---|---|
| | C | H | N |
| Found (%) | 67.90 | 7.27 | 4.37 |
| Calculated (%) | 68.12 | 7.31 | 4.42 |

NMR ($\delta$ CDCl$_3$)

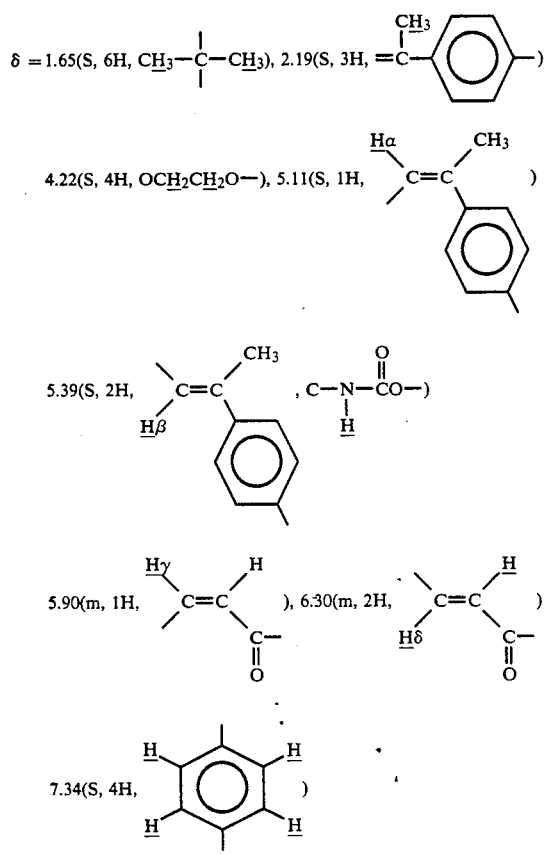

$\delta = 1.65$(S, 6H, C$\underline{H}_3$—C—C$\underline{H}_3$), 2.19(S, 3H, =C—⌬—)

4.22(S, 4H, OC$\underline{H}_2$C$\underline{H}_2$O—), 5.11(S, 1H, ...)

5.39(2H, ...), C—N—CO—

5.90(m, 1H, ...), 6.30(m, 2H, ...)

7.34(S, 4H, ...)

SYNTHESIS EXAMPLE 4

The procedure of Example 2 was repeated, except that 10.0 parts of 4-isopropenyl-α,α-dimethylbenzyl isocyanate were used instead of 10.0 parts of 3-isopropenyl-α,α-dimethylbenzyl isocyanate, thereby producing 14.2 parts of N-(4-isopropenyl-α,α-dimethylbenzyl)-2-methacryloyloxyethyl carbamate that was colorless and syrupy.

| Elemental analysis figures (calculated for $C_{19}H_{25}NO_4$): | | | |
|---|---|---|---|
| | C | H | N |
| Found (%) | 68.53 | 7.40 | 4.19 |
| Calculated (%) | 68.86 | 7.61 | 4.23 |

NMR ($\delta$ CDCl$_3$)

$\delta = 1.64$(S, 6H, C$\underline{H}_3$—C—C$\underline{H}_3$), 1.90(S, 3H, CH$_2$=C—C—)

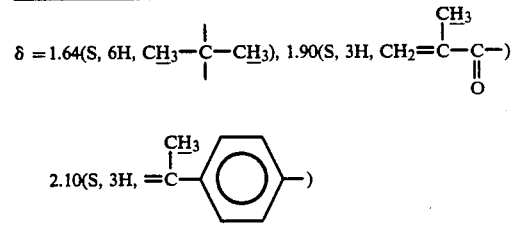

2.10(S, 3H, =C—⌬—)

-continued 4.20(S, 4H, —OC$\underline{H}_2$C$\underline{H}_2$O—)

5.03(S, 1H, 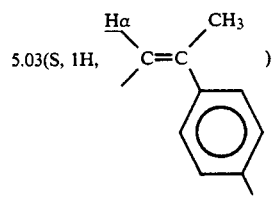)

5.30(S, 2H, , C—N—CO—)

5.52(S, 1H, 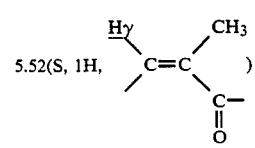)

6.06(S, 1H, )

7.34(S, 4H, 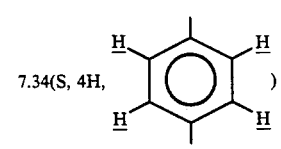)

SYNTHESIS EXAMPLE 5

The procedure of Example 2 was repeated, except that 6.5 parts of 2-hydroxypropyl acrylate were used instead of 6.5 parts of 2-hydroxyethyl methacrylate, and the temperature of the reaction medium was maintained at 80° C. instead of 65° C., thereby producing 13.8 parts of N-(3-isopropenyl-α,α-dimethylbenzyl)-1-acryloyloxypropan-2-yl carbamate that was colorless and syrupy.

| Elemental analysis figures (calculated for $C_{19}H_{25}NO_4$): | | | |
|---|---|---|---|
| | C | H | N |
| Found (%) | 68.66 | 7.53 | 4.29 |
| Calculated (%) | 68.86 | 7.61 | 4.23 |

NMR ($\delta$ CDCl$_3$)

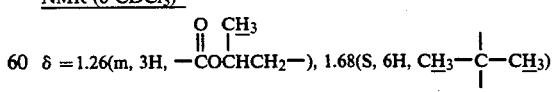

$\delta = 1.26$(m, 3H, —COCHC$\underline{H}_2$—), 1.68(S, 6H, C$\underline{H}_3$—C—C$\underline{H}_3$)

2.18(S, 3H, =C—⌬—), 4.10(m, 2H, —COCHC$\underline{H}_2$—)

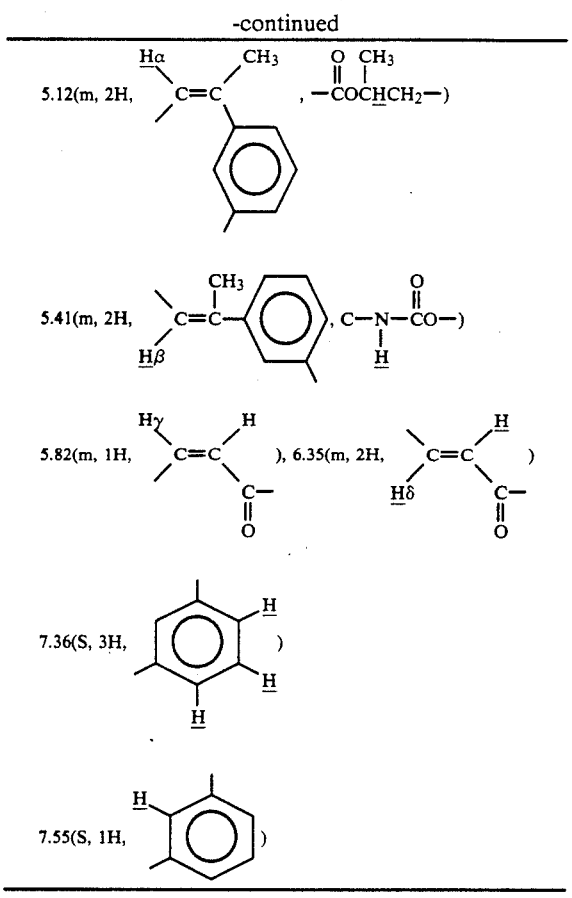

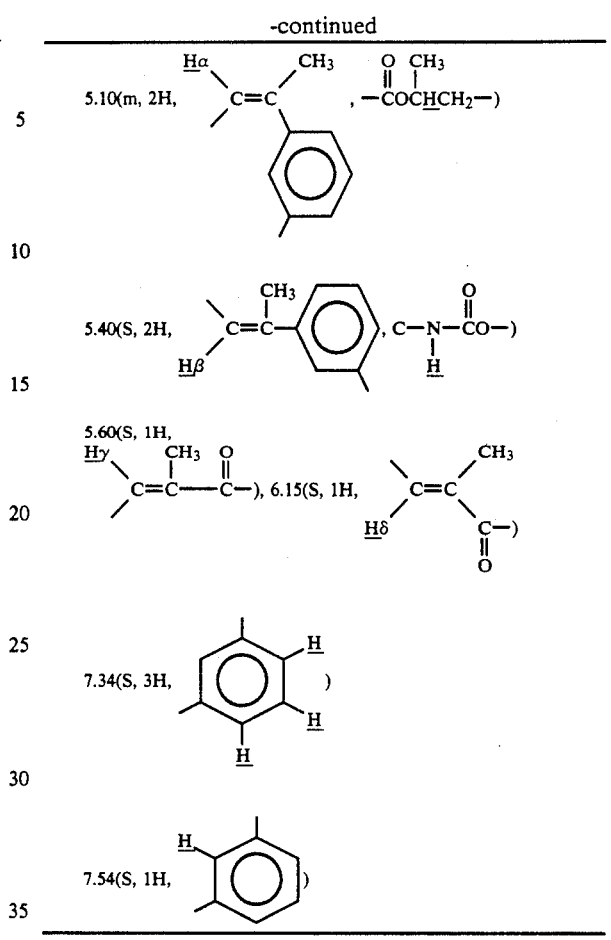

SYNTHESIS EXAMPLE 6

The procedure of Example 2 was repeated, except that 7.5 parts of 2-hydroxypropyl methacrylate were used instead of 6.5 parts of 2-hydroxyethyl methacrylate, the temperature of the reaction medium was maintained at 80° C. instead of 65° C., and the amount of the dibutyl tin laurate was 0.2 part instead of 0.1 part, thereby producing 15.1 parts of N-(3-isopropenyl-α,α-dimethylbenzyl)-1-methacryloyloxypropan-2-yl carbamate that was colorless and syrupy.

| Elemental analysis figures (calculated for $C_{20}H_{27}NO_4$): | | | |
|---|---|---|---|
| | C | H | N |
| Found (%) | 69.45 | 7.71 | 4.01 |
| Calculated (%) | 69.54 | 7.87 | 4.05 |

NMR (δ CDCl₃)

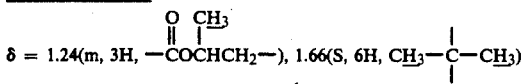

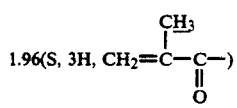

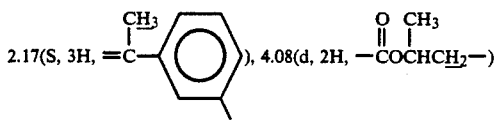

SYNTHESIS EXAMPLE 7

10.0 parts of 4-isopropenyl-α,α-dimethylbenzyl isocyanate, 6.7 parts of 2-hydroxypropyl acrylate, 10.0 parts of benzene, and 0.5 part of dibutyl tin dilaurate (used as a reaction-promoting catalyst) were mixed, and the resulting reaction was carried out for 5 hours with stirring while the temperature of the reaction medium was kept at 60° C. After the reaction was complete, the reaction medium was purified by chromatography to yield 12.8 parts of N-(4-isopropenyl-α,α-dimethylbenzyl)-1-acryloyloxypropan-2-yl carbamate that was colorless and syrupy.

| Elemental analysis figures (calculated for $C_{19}H_{25}NO_4$): | | | |
|---|---|---|---|
| | C | H | N |
| Found (%) | 68.45 | 7.44 | 4.07 |
| Calculated (%) | 68.86 | 7.61 | 4.23 |

NMR (δ CDCl₃)

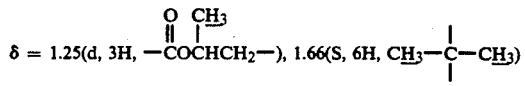

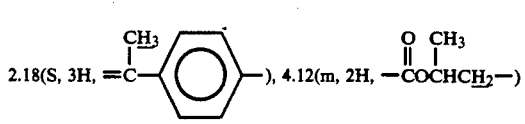

| | |
|---|---|
| 5.12(m, 2H, | 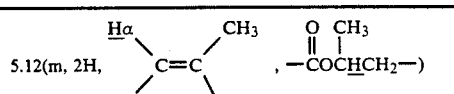 , —COCHCH₂—) |
| 5.40(m, 2H, | 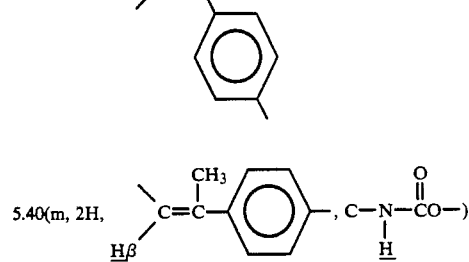 , C—N—CO—) |
| 5.81(m, 1H, 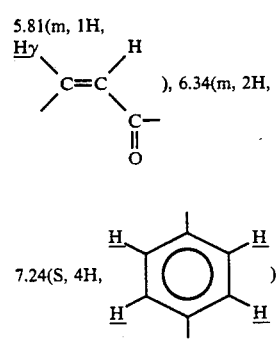 ), 6.34(m, 2H, | |
| 7.24(S, 4H, | ) |

SYNTHESIS EXAMPLE 8

12.0 parts of 3-isopropenyl-α,α-dimethylbenzyl isocyanate, 10.0 parts of toluene, and 11.9 parts of glycerol-1,3-diacrylate were mixed, and the resulting reaction was carried out for 3 hours with stirring while the temperature of the reaction medium was kept at 90° C. After the reaction was complete, the reaction medium was condensed. The condensed medium was purified by chromatography to yield 2.4 parts of N-(3-isopropenyl-α,α-dimethylbenzyl)-1,3-diacryloyloxypropan-2-yl carbamate that was colorless and syrupy.

| Elemental analysis figures (calculated for $C_{22}H_{27}NO_6$): | | | |
|---|---|---|---|
| | C | H | N |
| Found (%) | 65.54 | 6.57 | 3.33 |
| Calculated (%) | 65.82 | 6.78 | 3.49 |

NMR (δ CDCl₃)

δ = 1.66(s, 6H, 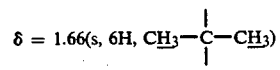)

2.14(s, 3H, 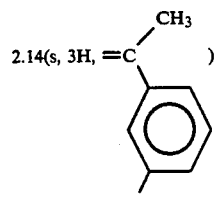)

4.36(s, 4H, 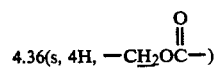)

| | |
|---|---|
| 5.06(s, 1H, | 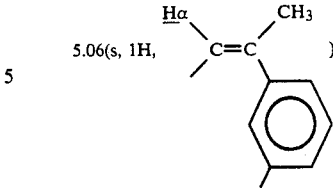 ) |
| 5.15(s, 1H, —COCH ) | |
| 5.34(s, 2H, | 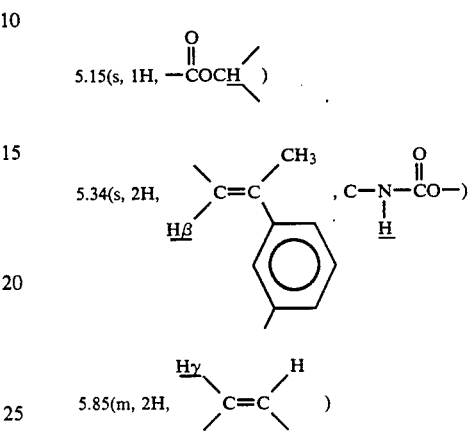 , C—N—CO—) |
| 5.85(m, 2H, | 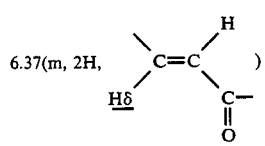 ) |
| 6.13(m, 2H, —C=CHCO—) | |
| 6.37(m, 2H, | 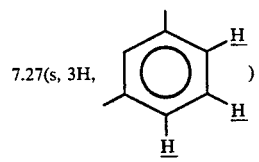 ) |
| 7.27(s, 3H, | 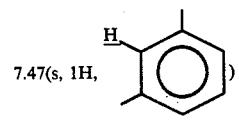 ) |
| 7.47(s, 1H, | ) |

SYNTHESIS EXAMPLE 9

48.0 parts of 3-isopropenyl-α,α-dimethylbenzyl isocyanate, 54.4 parts of glycerol-1,3-dimethacrylate, and 0.5 part of dibutyl tin dilaurate (used as a reaction-promoting catalyst) were mixed, and the resulting reaction was carried out for 1 hour with stirring while the temperature of the reaction medium was kept at 60° C. After the reaction was complete, the reaction medium was purified by chromatography to yield 63.0 parts of N-(3-isopropenyl-α,α-dimethylbenzyl-1,3-dimethacryloyloxypropan-2-yl carbamate that was colorless and syrupy.

| Elemental analysis figures (calculated for $C_{24}H_{31}NO_6$): | | |
|---|---|---|
| C | H | N |

| -continued | | | |
|---|---|---|---|
| Found (%) | 66.90 | 7.13 | 3.09 |
| Calculated (%) | 67.11 | 7.27 | 3.26 |

NMR (δ CDCl₃)

δ = 1.66(s, 6H, C$\underline{H}$₃—C—C$\underline{H}$₃)

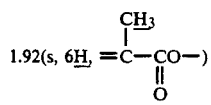
1.92(s, 6$\underline{H}$, =C—CO—) with CH₃

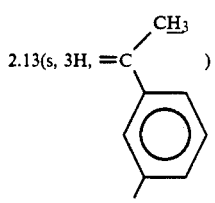
2.13(s, 3H, =C—(tolyl) with CH₃)

4.25(m, 4H, —C$\underline{H}$₂OC(=O)—)

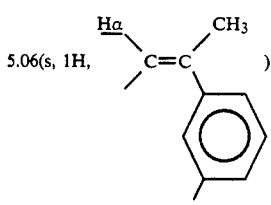
5.06(s, 1H, Hα C=C with CH₃ and tolyl)

5.22(s, 1H, —$\underline{\text{C}}$OC$\underline{H}$ )

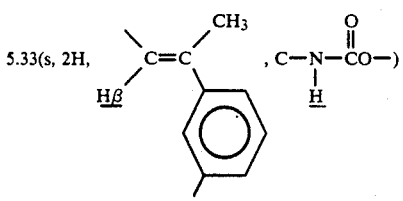
5.33(s, 2H, Hβ C=C with CH₃ and tolyl, C—N—CO—, $\underline{H}$)

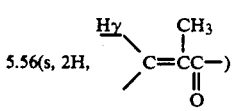
5.56(s, 2H, Hγ C=CC— with CH₃, O)

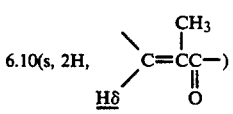
6.10(s, 2H, C=CC— with CH₃, Hδ, O)

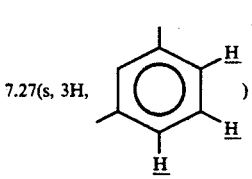
7.27(s, 3H, aromatic $\underline{H}$)

7.47(s, 1H, aromatic $\underline{H}$ on dimethylbenzene)

SYNTHESIS EXAMPLE 10

The procedure of Example 9 was repeated, except that 51.5 parts of glycerol-1-acrylate-3-methacrylate were used instead of 54.4 parts of glycerol-1,3-dimethacrylate, thereby producing 71.0 parts of N-(3-isopropenyl-α,α-dimethylbenzyl)-1-acryloyloxy-3-methacryloyloxypropan-2-yl carbamate that was colorless and syrupy.

| Elemental analysis figures (calculated for C₂₃H₂₉NO₆): | | | |
|---|---|---|---|
| | C | H | N |
| Found (%) | 66.11 | 6.99 | 3.23 |
| Calculated (%) | 66.49 | 7.04 | 3.37 |

NMR (δ CDCl₃)

δ =

1.67 (s, 6H, C$\underline{H}$₃—C—C$\underline{H}$₃)

1.93 (s, 3H, =C—CO— with CH₃)

2.14 (s, 3H, =C—(tolyl) with CH₃)

4.26 (m, 4H, —C$\underline{H}$₂—OC(=O)—)

5.07 (s, 1H, Hα C=C with CH₃ and tolyl)

5.24 (s, 2H, —$\underline{\text{C}}$OC$\underline{H}$ , —C—N—CO—, $\underline{H}$)

5.34 (s, 1H, Hβ C=C with CH₃ and tolyl)

-continued

| | |
|---|---|
| 5.58 (s, 1H, | $\text{H}\gamma\text{CH}_2\text{C}=\text{CC}(=O)-$ with CH₃) |
| 5.85 (m, 1H, | $\text{H}\epsilon,\text{H}\;\text{C}=\text{C}-\text{C}(=O)-$ ) |
| 6.11 (m, 2H, | $-\text{C}=\underline{\text{CH}}\text{CO}-$, $\text{C}=\text{CC}(=O)-$ H$\delta$) |
| 6.41 (m, 1H, | $\text{C}=\text{C}-\text{C}(=O)-$ H$\zeta$) |
| 7.30 (d, 3H, | aromatic ) |
| 7.48 (s, 1H, | aromatic ) |

SYNTHESIS EXAMPLE 11

The procedure of Example 9 was repeated, except that 48.0 of parts of 4-isopropenyl-α,α-dimethylbenzyl isocyanate, and 47.8 parts of glycerol-1,3-diacrylate were used instead of 48.0 parts of 3-isopropenyl-α,α-dimethylbenzyl isocyanate, and 54.4 parts of glycerol-1,3-dimethacrylate, respectively, thereby producing 62.1 parts of N-(4-isopropenyl-α,α-dimethylbenzyl)-1,3-diacryloyloxypropan-2-yl carbamate that was colorless and syrupy.

| Elemental analysis figures (calculated for $C_{22}H_{27}NO_6$): | | | |
|---|---|---|---|
| | C | H | N |
| Found (%) | 65.31 | 6.49 | 3.40 |
| Calculated (%) | 65.82 | 6.78 | 3.49 |

NMR (δ CDCl₃)
δ =

1.66 (s, 6H, $CH_3-C-CH_3$)

2.14 (s, 3H, 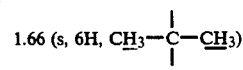 )

-continued

| | |
|---|---|
| 4.35 (s, 4H, | $-\underline{\text{CH}}_2-\text{CO}-$ (C=O)) |
| 5.03 (s, 1H, | H$\alpha$, CH₃, C=C with phenyl ) |
| 5.15 (s, 1H, | $-\text{COCH}$ (C=O)) |
| 5.34 (s, 2H, | H$\beta$, CH₃, C=C with phenyl, $-\text{C}-\text{N}-\text{CO}-$ H) |
| 5.83 (m, 2H, | H$\gamma$, C=C-C(=O)- ) |
| 6.10 (m, 2H, | $-\text{C}=\underline{\text{CH}}\text{CO}-$) |
| 6.35 (m, 2H, | H$\delta$, C=C-C(=O)- ) |
| 7.34 (s, 4H, | aromatic ) |

SYNTHESIS EXAMPLE 12

The procedure of Example 9 was repeated, except that 71.2 parts of pentaerythritol triacrylate were used instead of 54.4 parts of glycerol-1,3-dimethacrylate, thereby producing 50.2 parts of N-(3-isopropenyl-α,α-dimethylbenzyl)-2,2-diacryloyloxymethyl-3-acryloyloxypropyl carbamate that was colorless and syrupy.

| Elemental analysis figures (calculated for $C_{27}H_{33}NO_8$): | | | |
|---|---|---|---|
| | C | H | N |
| Found (%) | 64.19 | 6.37 | 2.80 |
| Calculated (%) | 64.92 | 6.66 | 2.80 |

NMR (δ CDCl₃)

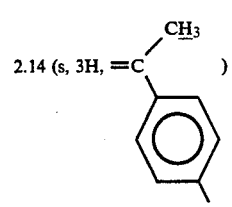

-continued

δ =

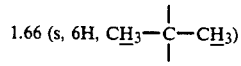
1.66 (s, 6H, C$\underline{H}_3$—C—C$\underline{H}_3$)

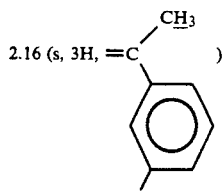
2.16 (s, 3H, =C$\overset{CH_3}{\diagdown}$ )

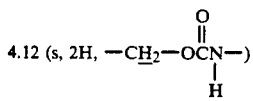
4.12 (s, 2H, —C$\underline{H}_2$—OCN—)

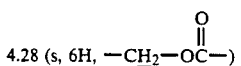
4.28 (s, 6H, —C$\underline{H}_2$—OC—)

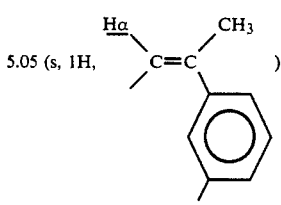
5.05 (s, 1H, $\overset{H\alpha}{\diagdown}$C=C$\overset{CH_3}{\diagup}$ )

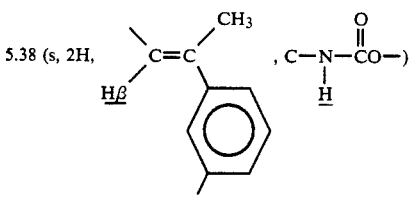
5.38 (s, 2H, C=C , C—N—CO—)

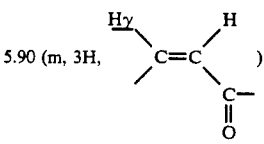
5.90 (m, 3H, )

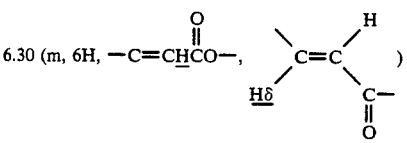
6.30 (m, 6H, —C=C$\underline{H}$CO—, )

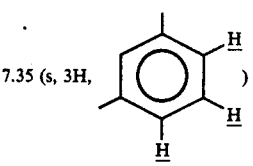
7.35 (s, 3H, )

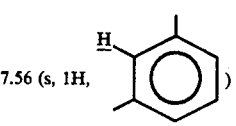
7.56 (s, 1H, )

SYNTHESIS EXAMPLE 13

The procedure of Example 9 was repeated, except that 48.0 parts of 4-isopropenyl-α,α-dimethylbenzyl isocyanate, and 81.3 parts of pentaerythritol methacrylate were used instead of 48.0 parts of 3-isopropenyl-α,α-dimethylbenzyl isocyanate, and 54.4 parts of glycerol-1,3-dimethacrylate, respectively, thereby producing 77.1 parts of N-(4-isopropenyl-α,α-dimethylbenzyl)-2,-dimethacryloyloxymethyl-3-methacryloyloxypropyl carbamate that was colorless and syrupy.

Elemental analysis figures (calculated for $C_{30}H_{39}NO_8$):

|  | C | H | N |
|---|---|---|---|
| Found (%) | 66.11 | 7.00 | 2.50 |
| Calculated (%) | 66.53 | 7.26 | 2.59 |

NMR (δ CDCl$_3$)

δ =

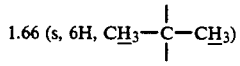
1.66 (s, 6H, C$\underline{H}_3$—C—C$\underline{H}_3$)

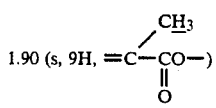
1.90 (s, 9H, =C—CO—)

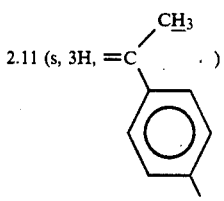
2.11 (s, 3H, =C$\overset{CH_3}{\diagdown}$ )

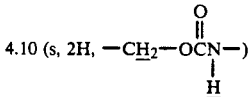
4.10 (s, 2H, —C$\underline{H}_2$—OCN—)

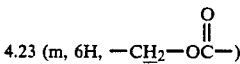
4.23 (m, 6H, —C$\underline{H}_2$—OC—)

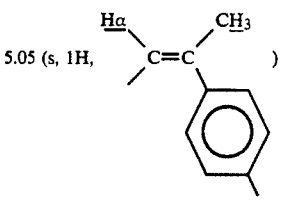
5.05 (s, 1H, C=C )

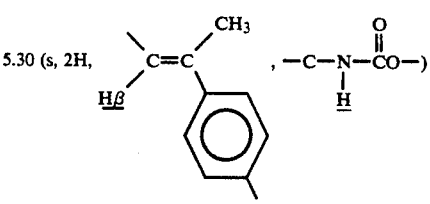
5.30 (s, 2H, C=C , —C—N—CO—)

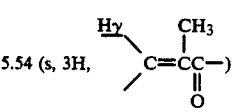
5.54 (s, 3H, C=CC—)

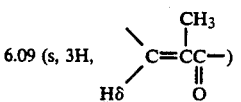
6.09 (s, 3H, C=CC—)

-continued

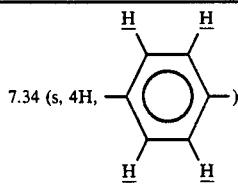
7.34 (s, 4H, ―)

The following examples recount preparation of representative hard transparent resins according to the present invention. The parts quoted are parts by weight and the percentages quoted are percentages by weight.

EXAMPLE 1

0.5 part of dibutyl tin dilaurate was added to 201 parts of 3-isopropenyl-α,α-dimethylbenzyl isocyanate, and then 130 parts of hydroxyethyl methacrylate were added gradually thereto while the reaction mixture was heated to maintain an internal temperature of 60° C., thereby carrying out a urethanization reaction to produce a viscous carbamate compound wherein absorption by the isocyanate group in the infrared absorption spectrum was almost nonexistent. After 0.2 part of t-butylperoxy-2-ethyl hexanoate was added thereto, and the mixture was stirred well, the resulting liquid was deaerated under reduced pressure and poured into a mold composed of two glass plates each having a thickness of 5 mm and a polyvinyl chloride spacer positioned therebetween and extending along the peripheries of the plates. With the glass plates clamped firmly, polymerization was effected by raising the temperature from 45° C. to 120° C. over 3 hours under heating in a hot-air oven. After cooling, a faintly yellowish transparent resin plate with a smooth surface was removed from the mold. The hardness of the plate, measured by the pencil hardness method (JIS-K-5401), was found to be 5H, the chemical resistance was good (as tested by immersing the resin plate in isopropanol and toluene at room temperature for 24 hours, and when it was not marked by an HB pencil, it was judged good), severing of the plate with a metal severing saw was possible, and grinding of the plate with a lens polisher for machining lenses of spectacles was also possible.

EXAMPLE 2

0.5 part of dibutyl tin dilaurate was added to 201 parts of 3-isopropenyl-α,α-dimethylbenzyl isocyanate, and then 116 parts of hydroxyethyl acrylate were added gradually thereto while the reaction mixture was heated to attain an internal temperature of 60° C., thereby carrying out a urethanization reaction to produce a viscous urethane compound wherein absorption by the isocyanate group in the infrared absorption spectrum was almost nonexistent. After 2.0 parts of t-butyl-peroxy-2-ethyl hexanoate were added thereto, and the mixture was stirred well, the resulting mixture was deaerated under reduced pressure and poured into a mold composed of two glass plates each having a thickness of 5 mm and a polyvinyl chloride spacer positioned therebetween and extending along the peripheries of the plates. With the glass plates clamped firmly, polymerization was effected by raising the temperature from 60° C. to 120° C. over 3 hours under heating in a hot-air oven. After cooling, a colorless transparent resin plate was removed from the mold. The pencil hardness of the plate was 5H, the chemical resistance thereof was good, severing of the plate with a metal severing saw was possible, and grinding of the plate with a lens polisher for machining lenses of spectacles was also possible.

EXAMPLE 3

The procedure of Example 2 was repeated, except that 144 parts of 2-hydroxypropyl acrylate were used instead of 130 parts of hydroxyethyl acrylate, thereby producing a colorless transparent resin plate. The pencil hardness of the plate was 4H, the chemical resistance thereof was good, severing of the plate with a metal severing saw was possible, and grinding of the plate with a lens polisher for machining lenses of spectacles was also possible.

EXAMPLE 4

0.5 part of dibutyl tin dilaurate was added to 201 parts of 4-isopropenyl-α,α-dimethylbenzyl isocyanate, and then 222 parts of 3-phenoxy-2-hydroxypropyl acrylate were added gradually thereto while the reaction mixture was heated to attain an internal temperature of 60° C., thereby carrying out a urethanization reaction to produce a viscous urethane compound wherein absorption by the isocyanate group in the infrared absorption spectrum was almost nonexistent. After 200 parts of methyl acrylate and 3.0 parts of t-butylperoxy-2-ethyl hexanoate were mixed well with the urethane compound, the resultant mixture was preliminarily polymerized with stirring at an internal temperature of 50° C. until the viscosity of the mixture reached 150 centipoises. Then the mixture was deaerated under reduced pressure and poured into a mold composed of two glass plates each having a thickness of 5 mm and a polyvinyl chloride spacer positioned therebetween and extending along the peripheries of the plates. With the glass plates clamped firmly, polymerization was effected by raising the temperature from 50° C. to 120° C. over 3 hours under heating in a hot-air oven. After cooling, a colorless transparent resin plate was removed from the mold. The pencil hardness of the plate was 4H, severing of the plate with a metal severing saw was possible, and grinding of the plate with a lens polisher for machining lenses of spectacles was also possible.

EXAMPLE 5

1.0 part of dibutyl tin dilaurate was added to 300 parts of styrene, and 201 parts of 3-isopropenyldimethylbenzyl isocyanate, and then 514 parts of bisphenol A bis(2-hydroxymethacryloyloxypropylether) were added gradually thereto while the reaction mixture was heated to provide an internal temperature of 60° C., thereby carrying out a urethanization reaction to produce a viscous styrene mixture of a urethane compound wherein absorption by the isocyanate group in the infrared absorption spectrum was almost nonexistent. After 5.0 parts of t-butylperoxy-2-ethyl hexanoate were added thereto, and the mixture was stirred well, the resulting liquid was deaerated under reduced pressure and poured into a mold composed of two glass plates each having a thickness of 5 mm and a polyvinyl chloride spacer positioned therebetween and extending along the peripheries of the plates. With the glass plates clamped firmly, polymerization was effected by raising the temperature from 50° C. to 120° C. over 3 hours under heating in a hot-air oven. After cooling, a colorless transparent resin plate was removed from the mold. The pencil hardness of the plate was 5H, the chemical resistance thereof was good, severing of the plate with a metal severing saw was possible, and grinding of the plate with a lens polisher for machining lenses of spectacles was also possible.

EXAMPLE 6

148 parts of 4-mercaptomethyl-1-vinylstyrene were added to 201 parts of 3-isopropenyl-α,α-dimethylbenzyl isocyanate, then 4 parts of dibutyl tin dilaurate were added thereto, and the mixture was heated to provide an internal temperature of 60° C., thereby producing a viscous urethane compound wherein absorption by the isocyanate group in the infrared absorption spectrum was almost nonexistent. After 200 parts of neopentyl glycol dimethacrylate and 5 parts of t-butylperoxy-2-ethyl hexanoate were added thereto, and the mixture was stirred well, the resulting mixture was deaerated under reduced pressure and poured into a mold composed of two glass plates each having a thickness of 5 mm and a polyvinyl chloride spacer positioned therebetween and extending along the peripheries of the plates. With the glass plates clamped firmly, polymerization was effected by raising the temperature from 50° C. to 120° C. over 3 hours under heating in a hot-air oven. After cooling, a faintly yellowish transparent resin plate was removed from the mold. The pencil hardness of the plate was 4H, the chemical resistance thereof was good, severing of the plate with a metal severing saw was possible, and grinding of the plate with a lens polisher for machining lenses of spectacles was also possible.

EXAMPLE 7

0.5 part of dibutyl tin dilaurate was added to 201 parts of 3-isopropenyl-α,α-dimethylbenzyl isocyanate, then 93 parts of hydroxyethyl acrylate were added gradually thereto while the reaction mixture was heated to provide an internal temperature of 60° C., and 60 parts of pentaerythritol triacrylate were added gradually thereto, thereby carrying out a urethanization reaction to produce a viscous urethane compound wherein absorption by the isocyanate group in the infrared absorption spectrum was almost nonexistent. After 2.0 parts of t-butylperoxy-2-ethyl hexanoate were added thereto, and the mixture was stirred well, the resulting liquid was deaerated under reduced pressure and poured into a mold composed of two glass plates each having a thickness of 5 mm and a polyvinyl chloride spacer positioned therebetween and extending along the peripheries of the plates. With the glass plates clamped firmly, polymerization was effected by raising the temperature from 50° C. to 120° C. over 3 hours under heating in a hot-air oven. After cooling, a colorless transparent resin plate was removed from the mold. The pencil hardness of the plate was 6H, the chemical resistance thereof was good, severing of the plate with a metal severing saw was possible, and grinding of the plate with a lens polisher for machining lenses of spectacles was also possible.

EXAMPLE 8

200 parts of 3-isopropenyl-α,α-dimethylbenzyl isocyanate were added to 100 parts of methyl acrylate, then 1 part of dibutyl tin dilaurate was added thereto, the mixture was heated to provide an internal temperature of 60° C., and then 300 parts of pentaerythritol triacrylate were added gradually to the reaction mixture, thereby producing a viscous methyl acrylate mixture of a urethane compound wherein absorption by the isocyanate group in the infrared absorption spectrum was almost nonexistent. After 5 parts of t-butylperoxy-2-ethyl hexanoate were added thereto, and the mixture was stirred well, the resulting mixture was deaerated under reduced pressure and poured into a mold composed of two glass plates each having a thickness of 5 mm and a polyvinyl chloride spacer positioned therebetween and extending along the peripheries of the plates. With the glass plates clamped firmly, polymerization was effected by raising the temperature from 45° C. to 120° C. over 3 hours under heating in a hot-air oven. After cooling, a colorless transparent resin plate was removed from the mold. The pencil hardness of the plate was 4H, the chemical resistance thereof was good, severing of the plate with a metal severing saw was possible, and grinding of the plate with a lens polisher for machining lenses of spectacles was also possible.

EXAMPLE 9

201 parts of 3-isopropenyl-α,α-dimethylbenzyl isocyanate were added to 113 parts of trimethylolpropane triacrylate, then 1 part of dibutyl tin dilaurate was added thereto, the mixture was heated to provide an internal temperature of 60° C., and then 116 parts of hydroxyethyl acrylate were added gradually to the reaction mixture, thereby producing a viscous trimethylolpropane mixture of a urethane compound wherein absorption by the isocyanate group in the infrared absorption spectrum was almost nonexistent. After 5 parts of t-butylperoxy-2-ethyl hexanoate were added thereto, and the mixture was stirred well, the resulting mixture was deaerated under reduced pressure and poured into a mold composed of two glass plates each having a thickness of 5 mm with a polyvinyl chloride spacer positioned therebetween and extending along the peripheries of the plates. With the glass plates clamped firmly, polymerization was effected by raising the temperature from 50° C. to 120° C. over 3 hours under heating in a hot-air oven. After cooling, a colorless transparent resin plate was removed from the mold. The pencil hardness of the plate was 6H, the chemical resistance thereof was good, severing of the plate with a metal severing saw was possible, and grinding of the plate with a lens polisher for machining lenses of spectacles was also possible.

COMPARATIVE EXAMPLE 1

3 parts of t-butylperoxy-2-ethyl hexanoate were added to 100 parts of diethylene glycol diallyl carbonate, stirred well, and the resulting mixture was deaerated and poured into a mold composed of two glass plates each having a thickness of 5 mm and a polyvinyl chloride spacer clamped firmly between the glass plates and extending along the peripheries thereof. Polymerization was effected by raising the temperature from 50° C. to 120° C. over 3 hours under heating in a hot-air oven. In the course of polymerization, rapid polymerization occurred at about 70° C., and the polymerized product separated from the glass mold, and turned yellow.

Only when the mixture was polymerized by raising the temperature from 50° C. to 120° C. over a period 10 hours, could a resin plate be obtained without separation from the mold. The pencil hardness of the plate was 3 H.

COMPARATIVE EXAMPLE 2

188 parts of m-xylylene diisocyanate were added to 200 parts of methyl methacrylate, then 0.5 part of dibutyl tin dilaurate was added thereto, and 260 parts of hydroxyethyl methacrylate were added gradually thereto while the mixture was heated to provide an internal temperature of 60° C., thereby producing a viscous methyl methacrylate mixture of a urethane compound wherein absorption by the isocyanate group in the infrared absorption spectrum was almost nonexistent. After 3 parts of t-butylperoxy-2-ethyl hexanoate were added thereto, and the mixture was stirred well, the resulting mixture was deaerated under reduced pressure and poured into a mold composed of two glass plates each having a thickness of 5 mm and a polyvinyl chloride spacer positioned therebetween and extending along the peripheries of the plates. With the glass plates clamped firmly, polymerization was effected by raising the temperature from 45° C. to 120° C. over 3 hours under heating in a hot-air oven. In the course of polymerization, rapid polymerization occurred at about 65° C., and the polymerized product separated from the mold.

EXAMPLE 10

30.0 parts of N-(m-isopropenyldimethylbenzyl)-2-methacryloyloxyethyl carbamate, as prepared in Synthesis Example 2, 0.1 part of bis(4-t-butylcyclohexyl) peroxydicarbonate, and 0.1 part of t-butyl peroxyisopropyl carbonate were mixed to form a homogeneous mixture, and the mixture was deaerated under reduced pressure, and then was cast in a mold composed of a 150 mm × 150 mm glass sheet, and a vinyl chloride gasket. Polymerization was then effected for 1 hour at 60° C., and further for 1 hour at 120° C., whereafter the platelike polymerized item was removed from the mold. The hardness of the plate, as measured by the pencil hardness method (JIS-K-5401), was found to be 5H, the chemical resistance thereof was good, severing of the plate with a metal severing saw was possible, and grinding of the plate with a lens polisher for machining lenses of spectacles was also possible. The results of these test are given in Table 1.

The physical properties of the resins were measured by the following methods:

(1) Appearance: the plate-like polymerized item was visually observed, without magnification.

(2) Light transmittance: measured in accordance with ASTM D1003.

(3) Surface hardness: a pencil hardness test for paints according to JIS K-5401 was used.

(4) Heat resistance: after the polymerized item was allowed to stand in a hot-air drying chamber at 120° C. for 1 hour, it was visually observed without magnification. If it was not colored and was free of surface imperfections, it was judged to be ◯; when it was colored and had surface imperfections, it was judged to be X.

(5) Workability: when the polymerized item could be ground by a lens polisher for working lenses of spectacles, it was judged to be ◯, and when it could not be cut, it was judged to be X.

(6) Chemical resistance: the polymerized item was immersed in isopropanol and toluene at room temperature for 24 hours. When it was not marked by an HB pencil, it was judged as ◯, while when it was marked by an HB pencil, it was judged as X.

EXAMPLE 11

The procedure of Example 10 was repeated, except that 30.0 parts of N-(3-isopropenyl-α,α-dimethylbenzyl)-1-acryloyloxypropan-2-yl carbamate, as prepared in Synthesis Example 5, were used instead of 30.0 parts of N-(3-isopropenyl-α,α-dimethylbenzyl)-2-methacryloyloxyethyl carbamate, thereby producing a plate-like polymerized item.

The pencil hardness of the plate was 5H, the chemical resistance thereof was good, severing of the plate with a metal cutting saw was possible, and grinding of the plate with a lens polisher for working lenses of spectacles was also possible.

EXAMPLE 12

The procedure of Example 10 was repeated, except that 30.0 parts of N-(4-isopropenyl-α,α-dimethylbenzyl)-2-acryloyl-oxyethyl carbamate, as prepared in Example 7, were 25 used instead of 30.0 parts of N-(3-isopropenyl-α,α-dimethylbenzyl)-2-methacryloyloxyethyl carbamate, thereby producing a plate-like polymerized item.

The pencil hardness of the plate was 5H, the chemical resistance thereof was good, severing of the plate with a metal cutting saw was possible, and grinding of the plate with a lens polisher for working lenses of spectacles was also possible.

EXAMPLE 13

The procedure of Example 10 was repeated, except that 30.0 parts of N-(4-isopropenyl-α,α-dimethylbenzyl)-1-methacryloyloxypropan- 2-yl carbamate, as prepared in Example 4, were used instead of 30.0 parts of N-(3-isopropenyl-α,α-dimethylbenzyl)methacryloyloxyethyl carbamate, thereby producing a platelike polymerized item.

The pencil hardness of the plate was 5H, the chemical resistance thereof, severing of the plate with a metal cutting saw was possible, and grinding of the plate with a lens polisher for working lenses of spectacles was also possible.

EXAMPLE 14

30.0 parts of N-(3-isopropenyl-α,α-dimethylbenzyl)acryloyloxyethyl carbamate, as prepared in Synthesis Example 1, 1.5 parts of styrene, 0.1 part of t-butyl peroxypivalate, and 0.1 part of t-butyl peroxyisopropyl carbonate were homogeneously mixed, and the resulting mixture was cast in a mold composed of a 150 mm × 150 mm glass sheet, and a vinyl chloride gasket. After polymerization at 70° C. for 1 hour, and further at 120° C. for 1 hour, the resultant platelike polymerized item was removed from the mold.

The pencil hardness of the plate was 5H, the chemical resistance was good, severing of the plate with a metal cutting saw was possible, and grinding of the plate with a lens polisher for working lenses of spectacles was also possible.

EXAMPLE 15

30.0 parts of N-(4-isopropenyl-α,α-dimethylbenzyl)-methacryloyloxypropyl carbamate, 1.5 parts of methyl methacrylate, 0.1 part of bis(4-t-butylcyclohexyl) peroxydicarbonate, and 0.1 part of t-butyl peroxyisopropyl carbonate were homogeneously mixed, and the resulting mixture was cast in a mold composed of a 150 mm × 150 mm glass sheet, and a vinyl chloride gasket.

After polymerization at 60° C. for 1 hour, and further at 120° C. for 1 hour, the resultant platelike polymerized item was removed from the mold.

The pencil hardness of the plate was 5H, the chemical resistance thereof was good, severing of the plate with a metal cutting saw was possible, and grinding of the plate with a lens polisher for working lenses of spectacles was also possible.

TABLE 1

|  | Application Example 1 | Application Example 2 | Application Example 3 | Application Example 4 | Application Example 5 | Application Example 6 |
|---|---|---|---|---|---|---|
| Appearance | colorless, transparent | colorless transparent | colorless transparent | colorless transparent | colorless transparent | colorless transparent |
| Light transmittance (%) | 91 | 91 | 91 | 90 | 90 | 91 |
| Surface hardness | 5H | 5H | 5H | 5H | 5H | 5H |
| Heat resistance | ○ | ○ | ○ | ○ | ○ | ○ |
| Workability | ○ | ○ | ○ | ○ | ○ | ○ |
| Chemical resistance | ○ | ○ | ○ | ○ | ○ | ○ |

EXAMPLE 16

30.0 parts of N-(3-isopropenyl-α,α-dimethylbenzyl)-1,3-diacryloyloxypropan-2-yl carbamate, as prepared in Synthesis Example 8, 0.03 part of lauroyl peroxide, and 0.15 part of benzoyl peroxide were mixed uniformly, and the resulting mixture was cast in a mold composed of a 150 mm × 150 mm glass sheet, and a vinyl chloride gasket. After polymerization at 55° C. for 1 hour, and further at 130° C. for 1 hour, the platelike polymerized item was removed from the mold.

EXAMPLE 17

The procedure of Example 16 was repeated, except that 30.0 parts of N-(3-isopropenyl-α,α-dimethylbenzyl)-1,3-dimethacryloyloxypropan-2-yl carbamate, as prepared in Example 9, were used instead of 30.0 parts of N-(3-isopropenyl-α,α-dimethylbenzyl)-1,3-diacryloyloxypropan-2-yl carbamate, polymerization was effected for 1 hour at 60° C. instead of 55° C., and further for 2 hours at 140° C. instead of 130° C., thereby producing a plate-like polymerized item.

EXAMPLE 18

The procedure of Example 17 was repeated, except that 30.0 parts of N-(3-isopropenyl-α,α-dimethylbenzyl)-1-acryloyloxy-3-methacryloyloxypropan-2-yl carbamate, as prepared in Example 10, were used instead of 30.0 parts of N-( 3-isopropenyl-α,α-dimethylbenzyl)-1,3-dimethacryloyloxypropan-2-yl carbamate, thereby producing a plate-like polymerized item.

EXAMPLE 19

The procedure of Example 17 was repeated, except that 30.0 parts of N-(4-isopropenyl-α,α-dimethylbenzyl)-1,3-acryloyloxypropan-2-yl carbamate, as prepared in Example 11, were used instead of 30.0 parts of N-(3-isopropenyl-α,α-dimethylbenzyl)-1,3-dimethacryloyloxypropan-2-yl carbamate, thereby producing a plate-like polymerized item.

EXAMPLE 20

30.0 parts of N-(3-isopropenyl-α,α-dimethylbenzyl)-2,2-diacryloyloxymethyl-3-acryloyloxypropyl carbamate, as prepared in Synthesis Example 12, 0.01 part of lauroyl peroxide, and 0.15 part of t-butyl peroxy-2-ethyl hexanoate were mixed uniformly, and the resulting mixture was cast in a mold composed of a 150 mm × 150 mm glass sheet, and a vinyl chloride gasket. After polymerization at 55° C. for 1 hour, and further at 130° C. for 2 hours, the platelike polymerized item was removed from the mold.

The results of these test are given in Table 2.

Although the present invention has been described in connection with various preferred embodiments thereof, it is evident that other embodiments thereof will be apparent to those skilled in the art from a reading of the present specification and practice of the invention disclosed herein. Accordingly, it is intended that the true scope and spirit of the invention be indicated by the following claims.

TABLE 2

|  | Application Example 7 | Application Example 8 | Application Example 9 | Application Example 10 | Application Example 11 |
|---|---|---|---|---|---|
| Appearance | colorless, transparent | colorless transparent | colorless transparent | colorless transparent | colorless transparent |
| Light transmittance (%) | 91 | 91 | 91 | 91 | 91 |
| Surface hardness | 9H | 5H | 6H | 9H | 9H |
| Heat resistance | ○ | ○ | ○ | ○ | ○ |
| Workability | ○ | ○ | ○ | ○ | ○ |
| Chemical resistance | ○ | ○ | ○ | ○ | ○ |

What is claimed is:

1. A glazing material comprised of a hard transparent resin prepared by polymerizing a monomer (A) having a first functional group of the formula (I):

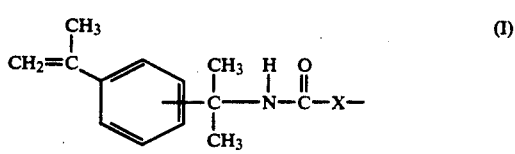

(I)

where in X is selected from the group consisting of an oxygen atom and a sulfur atom, and a second functional group selected from the group consisting of:

a functional group of the formula (II):

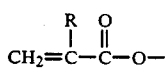

wherein R is selected from the group consisting of hydrogen and a methyl group, and
a functional group of the formula (III):

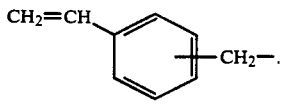

2. A glazing material comprised of a hard transparent resin prepared copolymerizing a monomer (A) having a first functional group of the formula (I):

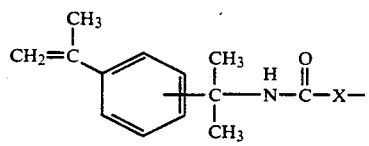

wherein X is selected from the group consisting of an oxygen atom and a sulfur atom,
and a second functional group of the formula (II):

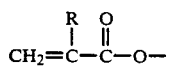

wherein R is selected from the group consisting of hydrogen and a methyl group, and
a functional group of the formula (III):

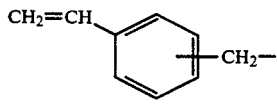

with a monomer (B) having at least one functional group selected from the group consisting of:

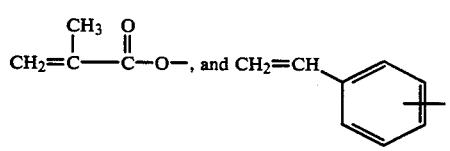

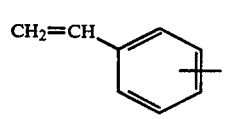

3. An optical lens comprised of a hard transparent resin prepared by polymerizing a monomer (A) having a first functional group of the formula (I):

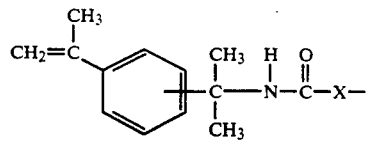

wherein X is selected from the group consisting of an oxygen atom and a sulfur atom,
and a second functional group selected from the group consisting of:
a functional group of the formula (II):

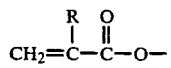

wherein R is selected from the group consisting of hydrogen and a methyl group and a functional group of the formula (III):

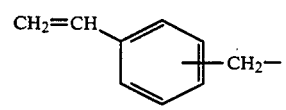

4. An optical lens comprised of a hard transparent resin prepared copolymerizing a monomer (A) having a first functional group of the formula (I):

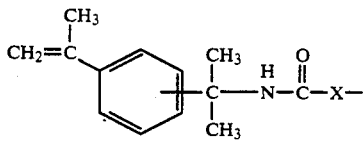

wherein X is selected from the group consisting of an oxygen atom and a sulfur atom,
and a second functional group of the formula (II):

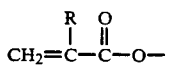

wherein R is selected from the group consisting of hydrogen and a methyl group and a functional group of the formula (III):

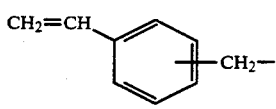

with a monomer (B) having at least one functional group selected from the group consisting of:

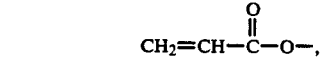

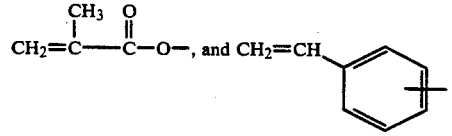

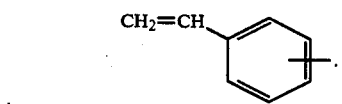

* * * * *